United States Patent
Kodmad

(10) Patent No.: US 11,748,118 B2
(45) Date of Patent: Sep. 5, 2023

(54) SYSTEMS AND METHODS FOR TRACKING AND VISUALIZING STATE TRANSITIONS

(71) Applicants: Atlassian Pty Ltd., Sydney (AU); Atlassian Inc., San Francisco, CA (US)

(72) Inventor: Pavithra Kodmad, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 59 days.

(21) Appl. No.: 17/025,856

(22) Filed: Sep. 18, 2020

(65) Prior Publication Data

US 2021/0089333 A1    Mar. 25, 2021

(51) Int. Cl.
*G06F 9/451* (2018.01)
*G06F 3/0484* (2022.01)
*G06T 13/80* (2011.01)
*G06Q 10/101* (2023.01)

(52) U.S. Cl.
CPC .............. *G06F 9/451* (2018.02); *G06T 13/80* (2013.01); *G06Q 10/101* (2013.01)

(58) Field of Classification Search
CPC ........ G06F 9/451; G06T 13/80; G06Q 10/101
See application file for complete search history.

(56) References Cited

U.S. PATENT DOCUMENTS

| | | | |
|---|---|---|---|
| 6,332,147 B1* | 12/2001 | Moran ..................... | G06F 16/40 715/231 |
| 6,532,023 B1* | 3/2003 | Schumacher ....... | G06F 11/3414 714/E11.193 |
| 8,832,660 B2 | 9/2014 | Lindo et al. | |
| 9,075,788 B1 | 7/2015 | Roth et al. | |
| 2005/0034148 A1* | 2/2005 | Jaeger .................. | G06F 3/04847 707/999.107 |
| 2006/0010420 A1* | 1/2006 | Peterson .............. | H04N 21/854 717/106 |
| 2011/0252301 A1* | 10/2011 | Vollmer ................ | G06F 16/904 715/229 |
| 2015/0347125 A1* | 12/2015 | High ..................... | G06F 3/0482 717/101 |
| 2016/0241676 A1 | 8/2016 | Armstrong et al. | |
| 2017/0083386 A1* | 3/2017 | Wing ........................ | G06F 1/30 |
| 2017/0285930 A1* | 10/2017 | Sykes ................. | H04N 21/4325 |
| 2019/0130227 A1* | 5/2019 | Blue ....................... | G06V 10/75 |
| 2021/0034206 A1* | 2/2021 | Yap ........................ | G06F 3/0481 |

FOREIGN PATENT DOCUMENTS

WO    WO2000/58880    10/2000

* cited by examiner

*Primary Examiner* — Kavita Stanley
*Assistant Examiner* — William Wong
(74) *Attorney, Agent, or Firm* — Brownstein Hyatt Farber Schreck, LLP

(57) ABSTRACT

Described herein is a computer implemented method comprising: generating a state transition replay request defining a time period and object selection criteria and communicating the state transition replay request to a server. In response to the state transition replay request replay data is received including starting state data indicating a starting state of objects satisfying the object selection criteria at a start of the time period; and transition data indicating state transitions of objects satisfying the object selection criteria over the time period. The replay data is used to display a transition replay interface in which a transition replay is displayed.

20 Claims, 13 Drawing Sheets

| To do 302 | In progress 304 | Code review 306 | Done 308 |
|---|---|---|---|
| 310 | | | 312 |
| 314 | | | |

FIG. 3A

| To do 302 | In progress 304 | Code review 306 | Done 308 |
|---|---|---|---|
| 310 | 314 | | 312 |

FIG. 3B

| To do 302 | In progress 304 | Code review 306 | Done 308 |
|---|---|---|---|
| 310 | | 314 | 312 |

FIG. 3C

| To do 302 | In progress 304 | Code review 306 | Done 308 |
|---|---|---|---|
| 310 | 314 | | 312 |

FIG. 3D

| To do 302 | In progress 304 | Code review 306 | Done 308 |
|---|---|---|---|
| 310 | | | 312 |
| 314 | | | |

FIG. 3E

| To do 302 | In progress 304 | Code review 306 | Done 308 |
|---|---|---|---|
| Obj. Id 1 | Obj. Id 3 ⤏ 1006 Obj. Id 3 | | |

FIG. 10C

| To do 302 | In progress 304 | Code review 306 | Done 308 |
|---|---|---|---|
| Obj. Id 1 | Obj. Id 3 ⬅ 1008 | Obj. Id 3 | |

FIG. 10D

SYSTEMS AND METHODS FOR TRACKING AND VISUALIZING STATE TRANSITIONS

CROSS-REFERENCE TO RELATED APPLICATION(S)

This application claims the benefit of Australian patent application no. AU2019903553, filed Sep. 24, 2019 and titled "Systems and Methods for Tracking and Visualising State Transitions," the disclosure of which is hereby incorporated herein by reference in its entirety.

FIELD

The present disclosure is directed to systems and methods for tracking and visualizing state transitions.

BACKGROUND

Various computer applications provide mechanisms for creating objects that represent items (for example tasks) and transitioning those objects through one or more states (e.g. from a 'to do' state to a 'done' state).

Background information described in this specification is background information known to the inventors. Reference to this information as background information is not an acknowledgment or suggestion that this background information is prior art or is common general knowledge to a person of ordinary skill in the art.

BRIEF DESCRIPTION OF THE DRAWINGS

In the drawings:

FIGS. 3A to 3E illustrate example point in time object states;

FIGS. 10A to 10E depict a sequence of state transition replay areas showing a transition replay.

Figure 1:
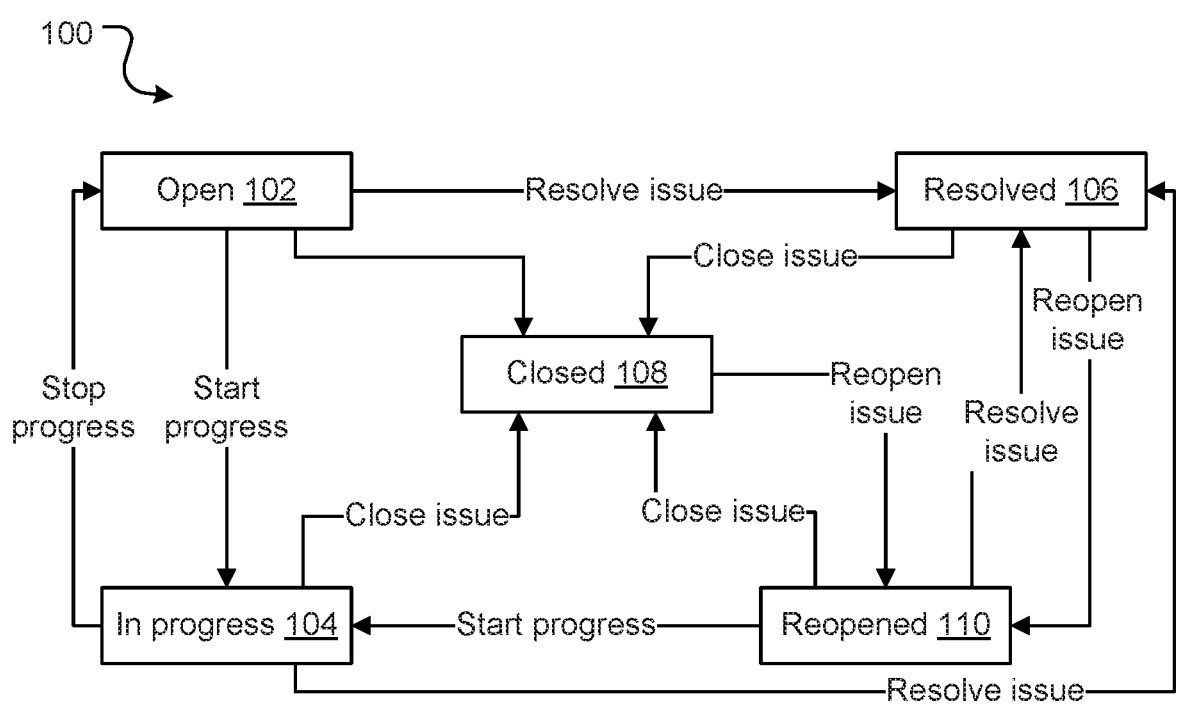
FIG. 1 illustrates an example set of object states and state transitions.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As discussed above, various computing applications and systems provide mechanisms for creating objects, object states, and transitioning objects between states.

One example of an object tracking application (as referred to in the present context) is TRELLO®. TRELLO® allows users to create objects in the forms of cards and object states in the form of lists. In order to change a cards state in TRELLO® a card is moved from one list to another. For example, a TRELLO® user may set up a board (a list of lists) having the lists "To Do", "In Progress", "Completed". A user may then create cards in respect of a particular tasks that need to be done and add them to the "To Do" list: e.g. a "grocery shopping" card, a "washing up" card, an "organise house party" card etc. The user can also transition cards between lists, e.g. by dragging or other means, from its current list to another one. For example, once the user has completed the grocery shopping they will drag the corresponding card from the "To Do" list to the "Completed" list. If the user has started but not completed work on their house party task they can drag the corresponding card from the "To Do" list to the "In Progress" list.

A further example of what the present disclosure refers to as an object tracking application is Jira. Jira allows users to create objects in various forms—for example issues or, more generally, work items. A work item in Jira is an object with associated information and an associated workflow—i.e. a series of states through which the work item transitions over its lifecycle. Any desired workflow maybe defined for a given type of work item. For example, FIG. 1 depicts a workflow 100 that could be used by a service desk handling issue work items. Workflow 100 defines the states that a given issue can take and the permitted transitions between states—e.g.; an open state 102, in progress state 104; a resolved state 106; a closed state 108; and a reopened state 110. Different workflows with different states and/or transitions between states will be appropriate for different implementations.

Figure 2:
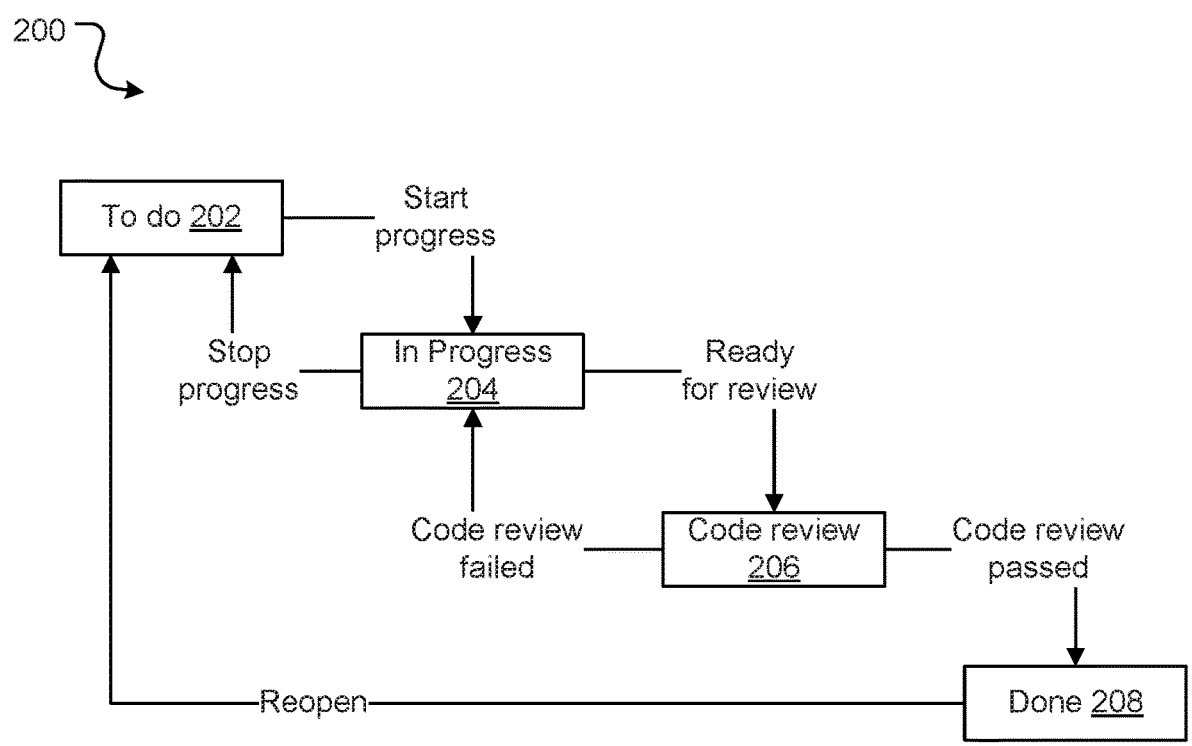
FIG. 2 illustrates an alternative example set of object states and state transitions.

As an alternative example, Jira can be configured to track software development projects. In this case, an example workflow 200 is depicted in FIG. 2. In workflow 200 a given work item can have (and transition between) the states of: to do 202 (e.g. work that has not yet been started); in progress 204 (e.g. work that is currently being done); code review 206 (e.g. work that has been competed but requires review before being deployed); and done 208 (work that is completely finished).

Object tracking applications such as those described above often provide user interfaces for displaying the current state of objects maintained by the application and allowing users to move objects (e.g. cards in TRELLO®, work items in Jira) between states. In both TRELLO® and Jira such user interfaces are referred to as boards. FIG. 3 provides an example board 300 which matches the workflow 200 of FIG. 2. Board 300 includes four columns, each corresponding to a workflow state: to do 302; in progress 304; code review 306; done 308. Board 300 also includes several visual representations of objects (tasks in the present context), each of which is in a particular column according to the current state of the object.

FIG. 3A shows a board 300 at a first point in time in which: object 310 has the title "task 1" and is the to do column/state; object 312 has the title "task 2" and is in the code review column/state; object 314 has the title "task 3" and is also in the to do column/state.

If a user or team assigned work on task 314 commences work, they can drag task 3 from the to do column 302 to the in progress column 304. This changes the underlying state of the task to the 'in progress' 204 state, and also causes an update so the board state at a second point in time is that shown in FIG. 3B.

The user/team may complete work on task 314 and transition it to the code review state. This changes the underlying state of the task to the 'code review' state 206, and also causes an update so the board state at a third point in time is that shown in FIG. 3C.

The user/team responsible for code review may identify issues in the code associated with task 314 and drag the task back to the in progress state 204. This changes the underlying state of the task to the 'in progress' state 204, and also causes an update so the board state at a fourth point in time is that shown in FIG. 3D.

At this point, the user/team assigned task 314 may be engaged with another task and drag task 314 back to the to do column 302 to be considered further later. This changes the underlying state of the task to the 'to do' 202 state, and also causes an update so the board state at a fifth point in time is that shown in FIG. 3E.

The state changes of task 314 depicted in FIGS. 3A to 3E expose an issue with user interfaces such as board 300. Specifically, if a user (e.g. a manager or supervisor) is trying to monitor the manner in which the project involving task 314 is progressing the point in time board states shown in FIGS. 3A to 3E may not provide relevant information. For example, if progress of the project is only checked by a supervisor at the first and fifth points in time (i.e. the board states of FIGS. 3A and 3E) the supervisor may well draw the conclusion that no work has been performed on the project as the board states in FIGS. 3A and 3E is identical.

The ability to monitor the progress of a project becomes even more difficult (or impossible) as the numbers of objects (e.g. tasks) and possible states increase. This can be daunting for a supervisor who is trying to gain an understanding of how a project (e.g. a group of objects related in some way) represented by the board has progressed rather than simply finding out the current state of the project (shown by the current board state). The difficulties are even more pronounced if, for example, a supervisor does not view a project's board for an extended period of time (e.g. several days, a week, a month).

In order to improve the ability to monitor progress, the present disclosure provides systems and methods for tracking object transitions and replaying object transitions.

Figure 4:
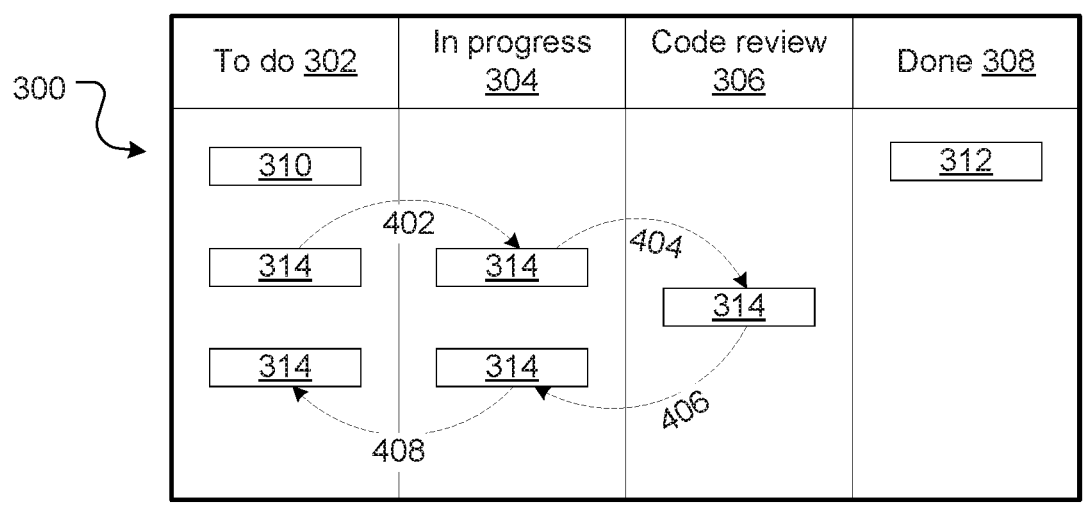
FIG. 4 depicts an animated replay of an object's transitions between states over time.

For example, a supervisor (or other user with appropriate permissions) could request to see the evolution of a board's state from a starting time up to the current time. If the starting point and current times are the first and fifth points in time of the above example, the present invention generates an interface in which object transition animations are displayed. A depiction of this is provided in FIG. 4, which illustrates: a first transition animation 402, in which task 314 starts in the to do column 302 and moves to the in progress column 304; a second transition animation 404, in which task 314 moves from the in progress column 304 to the code review column 306; a third transition animation 406, in which task 314 moves from the code review column 306 back to the in progress column 304; and a fourth transition animation 408 in which the task 314 moves from the in progress column 304 to the to do column 302. In this particular example no other tasks shown on board 300 have changed state between the start and end times, and therefore they remain static through the replay.

As used herein, an object refers any conceptual item that can transition between states. A given object will be of a particular object type. Some object tracking systems may only provide for a single, predefined, object type (with predefined object variables as discussed below). This may be the case, for example, in a very simple 'to do' list type object tracking system or application. Other object tracking systems allow various object types to be created or used, each different type of object type having its own associated object data. By way of example, different types of objects could include: stories (e.g. discrete pieces of work in a software development context); epics (e.g. groups of related stories in a software development context); issues or tickets or bugs (e.g. requests that have been raised in an issue tracking context); tasks (e.g. in a to-do list context); products (e.g. in an inventory management context); or any other type of object/item.

A given object will have/be defined by associated object data. Object data may take the form of object variables which can be used to store information regarding the object. The variables associated with a particular object will depend on the type of object and context. Some object tracking systems will allow users to define the particular object data associated with a particular object type (e.g. for objects of type x the object variables that can be used are a, b, and c). By way of example, and recognising that not all object variables will be appropriate for all object types, object variables may include: an object name; a unique object identifier (typically created by the application maintaining the object); an object type (indicating the type of the object and—in some cases—the states/state transitions available to the object); a date created; an assignee (indicating one or more individuals or teams the object is assigned to); current state (indicating the current state of the object); permissions (indicating users or types of users who have permission to view the object); comments (for users to add any comments—e.g. text—to the object); a deadline (a time at which handling of the object should be complete); a severity (indicating for an issue how severe the issue is—e.g. critical major, minor, etc.); a priority (indicating a priority the object should be given—e.g. very high, high, medium, low, very low, etc.); a rank (indicating a position in an object rank order); related objects (indicating any related objects); a project (indicating a project to which the object belongs); an associated epic (indicating an epic which an object is part of); dependencies (indicating any other objects that are reliant on processing of the current object); any other appropriate data field.

As used herein, object states refer to states a given object can take. For example the 'to do' state 202, the in progress state 204, the code review state 206, and the done state 208 described above. In some implementations, the states a given object can take, and potentially permissible state transitions, depend on/are linked to the type on the object (e.g. an object that is of type 'story' may have different states/state transitions to an object of type 'epic'). Any appropriate states can be defined. In some contexts an object can transition between any available states. In other contexts state transition rules are imposed and an object can only transition between two states if permitted by the rules (for example, in the states shown in FIG. 1 it is not possible for an object to transition from the open state 102 directly to the reopened state 110).

As used herein, an object tracking system (or object tracking application) is any system (or application) that at least facilitates the tracking of objects between states and visualization of objects in object states by generation and display of boards. Accordingly, examples of object tracking systems are TRELLO®, Jira, Bugzilla, and Asana, but many others exist.

In the following, a networked environment and computer processing system configurable to implement various features and techniques described herein are described. Following this, example computer implemented methods for recording object state transitions, receiving and processing transition replay requests, and generating state transition replays will be described.

Figure 5:
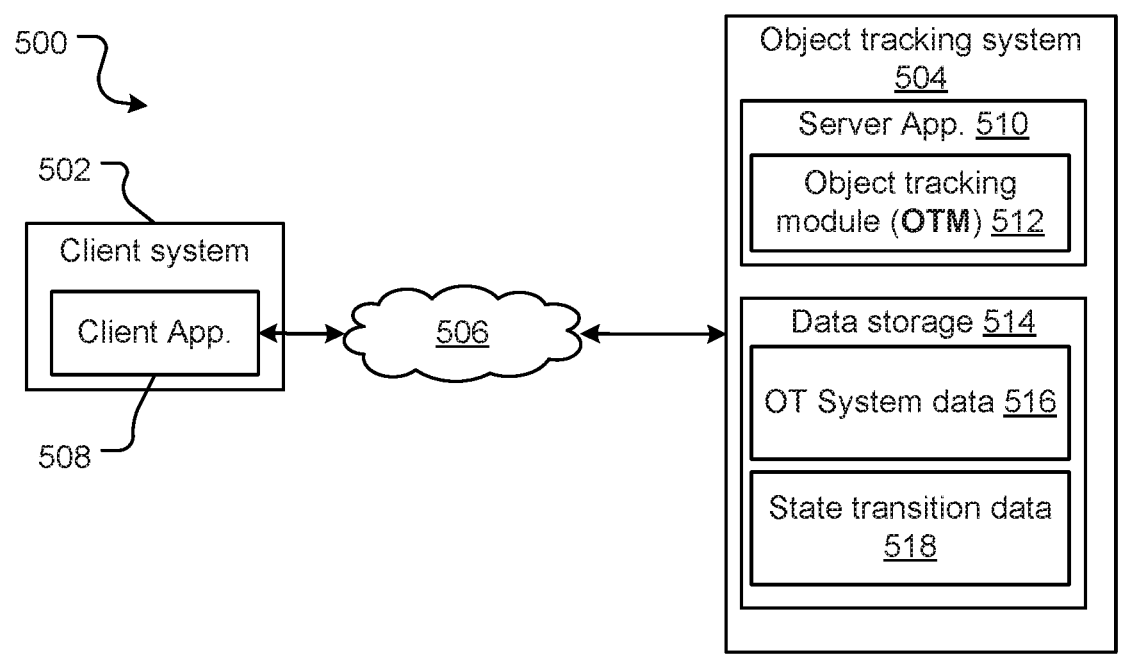
FIG. 5 is a diagram depicting a networked environment in which various features of the present disclosure may be implemented.

FIG. 5 depicts one example of a networked environment 500 in which the various operations and techniques described herein can be performed.

Networked environment 500 includes a client system 502 and an object tracking system 504 which communicate via one or more telecommunications networks 506 (e.g. the Internet).

The client system 502 and object tracking system 504 (or, more specifically, applications running on those systems) operate together to provide various functionality. The specific functionality provided will depend on the system in question, but can include, for example, allowing a user (interacting with the object tracking system 504 via a client application 508 running on their client system 502) to: define object states; create objects and assign them to states; move objects between states; and (as described in detail below) to request and view state transition replays.

Accordingly, client system 502 hosts a client application 508 which, when executed by the client system 502, configures the client system 508 to provide client-side functionality/interact with the object tracking sever system 504 (or, more specifically, server application 510 running thereon). Client side functionality includes, for example, generating and causing display of user interfaces by which a user interacts with the object tracking system 504.

The client application 508 may be a web browser application (such as CHROME™, SAFARI™, INTERNET EXPLORER™, OPERA™, or an alternative web browser application) which accesses the server application 510 via an appropriate uniform resource locator (URL) and communicates with the server application 510 via general world-wide-web protocols (e.g. http, https, ftp). Alternatively, the client application 508 may be a specific client application programmed to communicate with server application 510 using defined application programming interface (API) calls.

A given client system 502 may have more than one client application 508, for example both a general web browser application and a dedicated programmatic client application.

Object tracking system 504 hosts a server application 510. The server application is executed by the object tracking system 504 to configure it to provide server-side functionality to one or more corresponding client applications (e.g. 508 as discussed above). The server application 510 comprises one or more application programs, libraries, APIs or other software elements that implement the features and functions that are described herein. For example, where the client application 508 is a web browser, the server application 510 will be a web server such as Apache, IIS, nginx, GWS, or an alternative web server. Where the client application 508 is a specific application, the server application 510 will be an application server configured specifically to interact with that client application 508.

Object tracking system 504 may be provided with both web server and application server modules.

Object tracking system 504 of the present example further includes an object tracking module 512 (or OTM 512 for short). As described further below, OTM 512 performs various processing in order to track object state transitions and receive, process, and respond to object transition replay requests. While the OTM 512 is depicted as part of the server application 510 it could be part of an alternative application (running on object tracking system 504 or an alternative system connected to system 504). For example OTM 512 could be provided as a native part of an object tracking system, a plugin or add-on to an object tracking system, or a stand alone application that communicates with an object tracking system as required (e.g. via defined API calls or alternative means).

Object tracking system 504 also includes, or has access to, data storage 514. Data storage may be any data storage device or system, ranging, for example, from a database server and database (which could span several physical systems) to a simple storage device and file structure. Data storage 514 is used to store data relevant to the services being offered by the object tracking system 504. In the illustrated example, the data storage 514 stores object tracking system data 516 and state transition data 518. The object tracking system data 516 is data used for the normal operation of the object tracking system 512—for example user account data, permissions data, object type definitions, state transition workflows (where relevant—i.e. permissible state transitions), instantiated objects (i.e. specific objects created in accordance with object type definitions) etc. The state transition data 518 is data maintained and used by the OTM 512 when responding to state transition replay requests.

The object tracking system data 516 and state transition data 518 are described herein as separate data stores maintained on the same data storage system 514. In alternative embodiments, the object tracking system data 516 and state transition data 518 could be stored together (e.g. a single relational database or other data storage system), for example where the OTM 512 is an integral part of the object tracking system server application 510 (as opposed to a separate addon/plug-in/application). In further alternative embodiments, the object tracking system data 516 and state transition data 518 could be stored on separate data storage systems.

The client system 502 and object tracking system 504 communicate data between each other either directly or indirectly through one or more communications networks 506. Communications network 506 may comprise a local area network (LAN), a public network, or a combination of networks.

While the object tracking system 504 of environment 500 is depicted and described as a single server machine alternative architectures are possible. For example, in certain cases a clustered server architecture may be used where multiple server computing instances (or nodes) are instantiated on one or more computer processing systems to meet system demand. Conversely, in the case of small enterprises with relatively simple requirements the object tracking system 504 may be a stand-alone implementation (i.e. a single computer directly accessed/used by end users). Further, while a single client system 502 has been illustrated the object tracking system 504 is capable of serving/interacting with multiple client systems 502.

Client system 502 may be any computer processing system which is configured (or configurable) by hardware and/or software to offer client-side functionality. Similarly, object tracking system 504 may be any computer processing system which is configured (or configurable) by hardware and/or software to provide server-side functionality. Typically sever systems are more powerful (from a computer processing perspective) than client systems but this is not always the case. By way of example, while the object tracking system 504 will typically be implemented on server hardware, suitable client systems may include desktop computers, laptop computers, netbook computers, tablet computing devices, mobile/smart phone devices, and other computer processing devices.

One example of a computer processing system is described below with reference to FIG. 6.

Various embodiments and features of the present disclosure are implemented using one or more computer processing systems.

Figure 6:
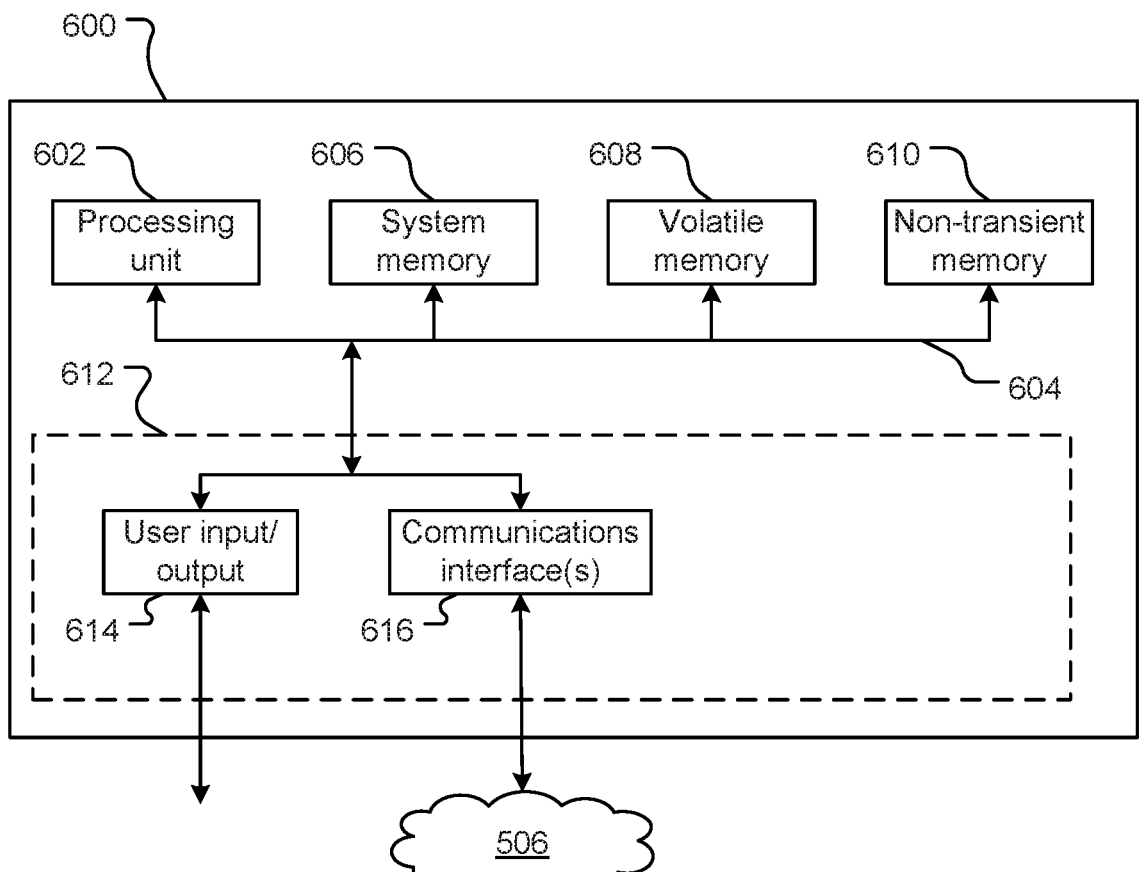
FIG. 6 is a block diagram of a computer processing system configurable to perform various features of the present disclosure.

FIG. 6 provides a block diagram of a computer processing system 600 configurable to implement embodiments and/or features described herein. System 600 is a general purpose computer processing system. It will be appreciated that FIG. 6 does not illustrate all functional or physical components of a computer processing system. For example, no power supply or power supply interface has been depicted, however system 600 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 600 includes at least one processing unit 602. The processing unit 602 may be a single computer processing device (e.g. a central processing unit, graphics processing unit, or other computational device), or may include a plurality of computer processing devices. In some instances all processing will be performed by processing unit 602, however in other instances processing may also be performed by remote processing devices accessible and useable (either in a shared or dedicated manner) by the system 600.

Through a communications bus 604 the processing unit 602 is in data communication with a one or more machine readable storage (memory) devices which store instructions and/or data for controlling operation of the processing system 600. In this example system 600 includes a system memory 606 (e.g. a BIOS), volatile memory 608 (e.g. random access memory such as one or more DRAM modules), and non-transient memory 610 (e.g. one or more hard disk or solid state drives).

System 600 also includes one or more interfaces, indicated generally by 612, via which system 600 interfaces with various devices and/or networks. Generally speaking, other devices may be integral with system 600, or may be separate. Where a device is separate from system 600, connection between the device and system 600 may be via wired or wireless hardware and communication protocols, and may be a direct or an indirect (e.g. networked) connection.

Wired connection with other devices/networks may be by any appropriate standard or proprietary hardware and connectivity protocols. For example, system 600 may be configured for wired connection with other devices/communications networks by one or more of: USB; FIREWIRE™; eSATA; THUNDERBOLT™; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 600 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 600 connects—whether by wired or wireless means—include one or more input devices to allow data to be input into/received by system 600 for processing by the processing unit 602, and one or more output device to allow data to be output by system 600. Example devices are described below, however it will be appreciated that not all computer processing systems will include all mentioned devices, and that additional and alternative devices to those mentioned may well be used.

For example, system 600 may include or connect to one or more input devices by which information/data is input into (received by) system 600. Such input devices may include keyboards, mice, trackpads, microphones, accelerometers, proximity sensors, GPS devices and the like. System 600 may also include or connect to one or more output devices controlled by system 600 to output information. Such output devices may include one or more display devices such as CRT displays, LCD displays, LED displays, plasma displays, touch screen displays, speakers, vibration modules, LEDs/other lights, and such like. System 600 may also include or connect to devices which may act as both input and output devices, for example memory devices (hard drives, solid state drives, disk drives, compact flash cards, SD cards and the like) which system 600 can read data from and/or write data to, and touch screen displays which can both display (output) data and receive touch signals (input).

System 600 also connects to one or more communications networks (e.g. the Internet, a local area network, a wide area network, a personal hotspot etc.) to communicate data to and receive data from networked devices, which may themselves be other computer processing systems.

System 600 may be any suitable computer processing system such as, by way of non-limiting example, a server computer system, a desktop computer, a laptop computer, a netbook computer, a tablet computing device, a mobile/smart phone, a personal digital assistant, a personal media player, a set-top box, a games console. [note repetition in computer processing system description]

Typically, system 600 will include at least user input and output devices 614 and a communications interface 616 for communication with a network such as network 506 of environment 500.

System 600 stores or has access to computer applications (also referred to as software or programs)—i.e. computer readable instructions and data which, when executed by the processing unit 602, configure system 600 to receive, process, and output data. Instructions and data can be stored on non-transient machine readable storage medium accessible to system 600. For example, instructions and data may be stored on non-transient memory 610. Instructions and data may be transmitted to/received by system 600 via a data signal in a transmission channel enabled (for example) by a wired or wireless network connection.

Applications accessible to system 600 will typically include an operating system application such as Microsoft Windows®, Apple OSX, Apple IOS, Android, Unix, or Linux.

System 600 also stores or has access to applications which, when executed by the processing unit 602, configure system 600 to perform various computer-implemented processing operations described herein. For example, and referring to the networked environment of FIG. 5 above, client system 502 includes a client application 508 which configures the client system 502 to perform the described client system operations, and object tracking system 504 includes a server application 510 which configures the object tracking system 504 to perform the described server system operations, In some cases part or all of a given computer-implemented method will be performed by system 600 itself, while in other cases processing may be performed by other devices in data communication with system 600.

In order to generate state transition replays as discussed below, state transition data is recorded and maintained.

In some implementations, state transition data may be recorded during 'normal' operation of the object tracking server application 510 (i.e. not by the object tracking module OTM 512 itself). In this case, relevant transition data may be available to the OTM 512 in the object tracking system data 516.

In other implementations, state transition data 518 is recorded and stored by the OTM 512. In some cases the OTM 512 may record its own state transition data even if part or all of the data used by the OTM 512 is also captured by the server application 510. This may be advantageous, for example, as it can avoid the need for the OTM 512 to access (and thus increase the load on) data stored by the server application 510 for other purposes. It may also be advantageous if even though relevant data is stored by the server application 510 its retrieval is complex—for example the relevant data is stored by the server application 510 across multiple tables in a complex relational database schema.

Figure 7:
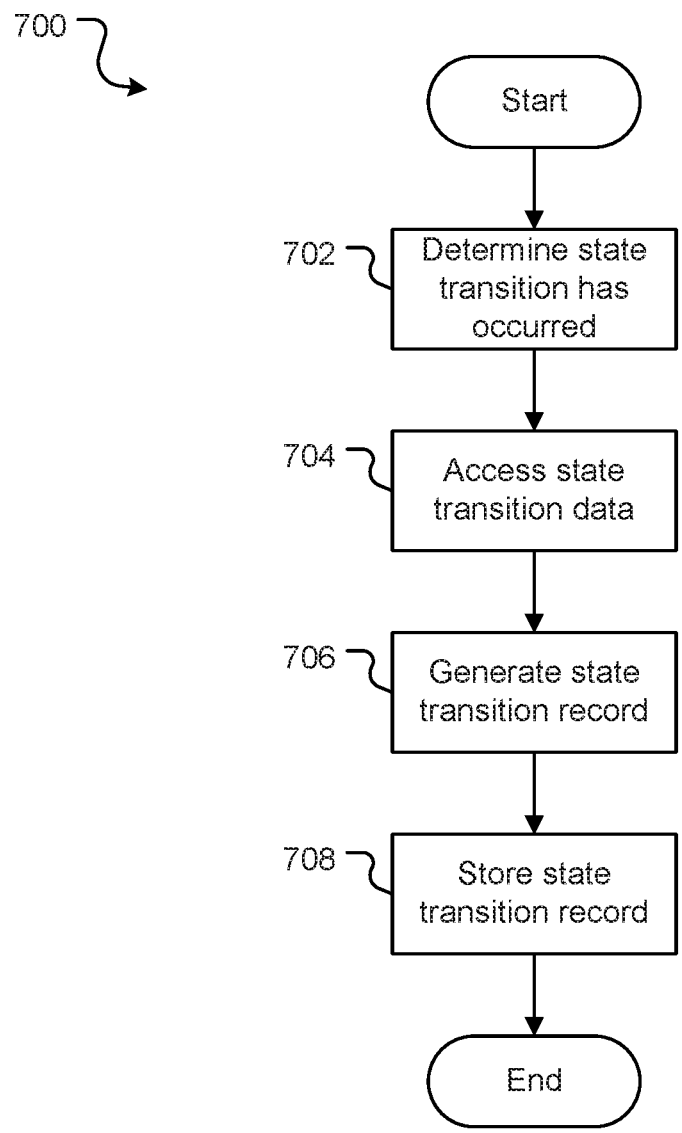
FIG. 7 is a flowchart depicting operations performed in a state transition recordal process.

In one particular implementation, the OTM 512 records object state transitions according to the state transition recordal process 700 of FIG. 7.

At 702, the OTM 512 determines that a state transition has occurred—i.e. that an object has been moved from a first (or start) state to a second (or end) state.

A state transition occurs any time an object is moved from one state to another. In certain implementations, creation of a new object (and assignment of that object to a particular state) and deletion of an existing object/deletion of an object's state assignment (i.e. so no state is recorded against an object, where this is permitted by the system) are considered state transitions.

Different object tracking systems will provide different mechanisms for performing state transitions. For example, one potential mechanism for performing a state transition is dragging objects between states in a user interface such as the boards described above. Another potential mechanism for performing state transitions is by directly amending object data—for example, in some systems object states are a variable of the object itself and can be amended in various ways: via command line interface, programmatic interface (e.g. API), in an object data view, by email or other messaging mechanisms, by rule-based automation (e.g. if x occurs, transition objects matching y to state z), or by any other means.

Accordingly, the OTM 512 may be configured to determine a state transition has been made in various ways. For example, the OTM 512 may be configured to monitor activity occurring on the object tracking system 504 to identify the occurrence of state transitions as they happen. Alternatively, the OTM 512 may be configured to periodically query the server application 510 (e.g. via an API call or other means) for data on all object transitions that have occurred in a given time period (e.g. since a previous query). Further alternatively, where state transition data is already captured in data storage 514 by the server application 510 (and the OTM 512 is nonetheless maintaining its own state transition data) the OTM 512 can be configured to periodically query the OT system data 516 to obtain relevant state transition data. Further alternatively, the server application 510 may be configured directly notify the OTM 512 when state transitions are made (either each time a state transition is made or in batches). Still further alternatively, the server application 510 may be configured to indirectly notify the OTM 512 of state transitions, for example by publishing state transitions to a publication/subscription type service that the OTM 512 subscribes to.

At 704, the OTM 512 accesses state transition data in respect of the state transition(s) determined to have been made at 702. Depending on implementation, the OTM 512 may access (or receive) the state transition data at the same time as determining that a state transition has been made. For example, where the server application 510 is configured to notify the OTM 512 of state transitions (either directly or indirectly) it may do so via state transition messages that include the required state transition data. Similarly, if the OTM 512 is configured to query either the server application 510 or the object tracking system data 516 for state transitions the query may return both the fact that a state transition has been made and the required state transition data.

The specific state transition data accessed at 704 will depend on implementation. By way of example, however, the OTM 512 may, for a given state transition, access data including: an object identifier; a transition from state; a transition to state; and a transition timestamp.

The object identifier is a unique identifier for the object that has transitioned from one state to another. Typically the server application 510 will create and maintain its own object identifiers and the OTM 512 can adopt the same object identifier.

The transition from state is an identifier of the state the object has transitioned from. The state identifier may be a state name (e.g. 'to do'), or could be an alternative unique state identifier that maps to a particular state.

In certain implementations, creation of a new object is considered a state transition. In this case the transition from state may be a special state indicating that the object did not previously exist—e.g. a 'non-existent' state.

The transition to state is an identifier (e.g. name or other identifier) of the state the object has transitioned to.

In certain implementations, deletion of an object (if permitted by the object tracking system) is considered a state transition. In this case the transition to state may be a special, predefined value indicating that the object has been deleted—e.g. a 'deleted' state.

The transition timestamp is a value indicating the time at which the transition was made. The transition time may be stored in any appropriate manner.

Additional state transition data may also be accessed and maintained. In some cases, however, such data may already be maintained by the server application 510 (in OT system data 516) so an implementation decision will need to be made as to whether the potential benefits of storing additional copies of data outweigh any disadvantages of querying the object tracking system data 516 on an as-needs basis. This, in turn, may depend on the data to be shown (and functionality to be provided) by the state transition replay interface as described below.

As a few examples, however, additional state transition data may include data such as an authoriser identifier (identifying the user or team who made or authorised the state transition to be made) and comments (allowing any comments in respect of the state transition to be captured).

At 706, the OTM 512 generates a state transition record that includes the state transition data, and at 708 the OTM 512 and stores the state transition record in the state transition data 518.

State transition data may be stored in any appropriate data structure. By way of one example, however, the state transition data structure may be a table with state transition records stored as rows thereof. E.g.:

| Object Identifier | Transition from state | Transition to state | Transition timestamp |
|---|---|---|---|

Example state transition records could then be as follows:

| Object Identifier | Transition from state | Transition to state | Transition timestamp |
|---|---|---|---|
| 1 | ~ | A | 12/09/2019 1:40 PM |
| 2 | ~ | D | 12/09/2019 1:41 PM |
| 3 | ~ | A | 12/09/2019 2:20 PM |
| 3 | A | B | 12/09/2019 3:00 PM |
| 3 | B | C | 13/09/2019 8:00 AM |
| 3 | C | B | 14/09/2019 4:45 PM |
| 3 | B | A | 14/09/2019 4:50 PM |

In this example, the ~character is used to identify a non-existent or null state (used, for example, as the from state of a newly created object or the to state on deletion of an object). Mapping this A the 'to do' state; B the 'in progress' state; C the 'code review' state; and D the 'done' state.

Once the state transition record has been stored at 708 the state transition recordal process 700 is complete.

Figure 8:
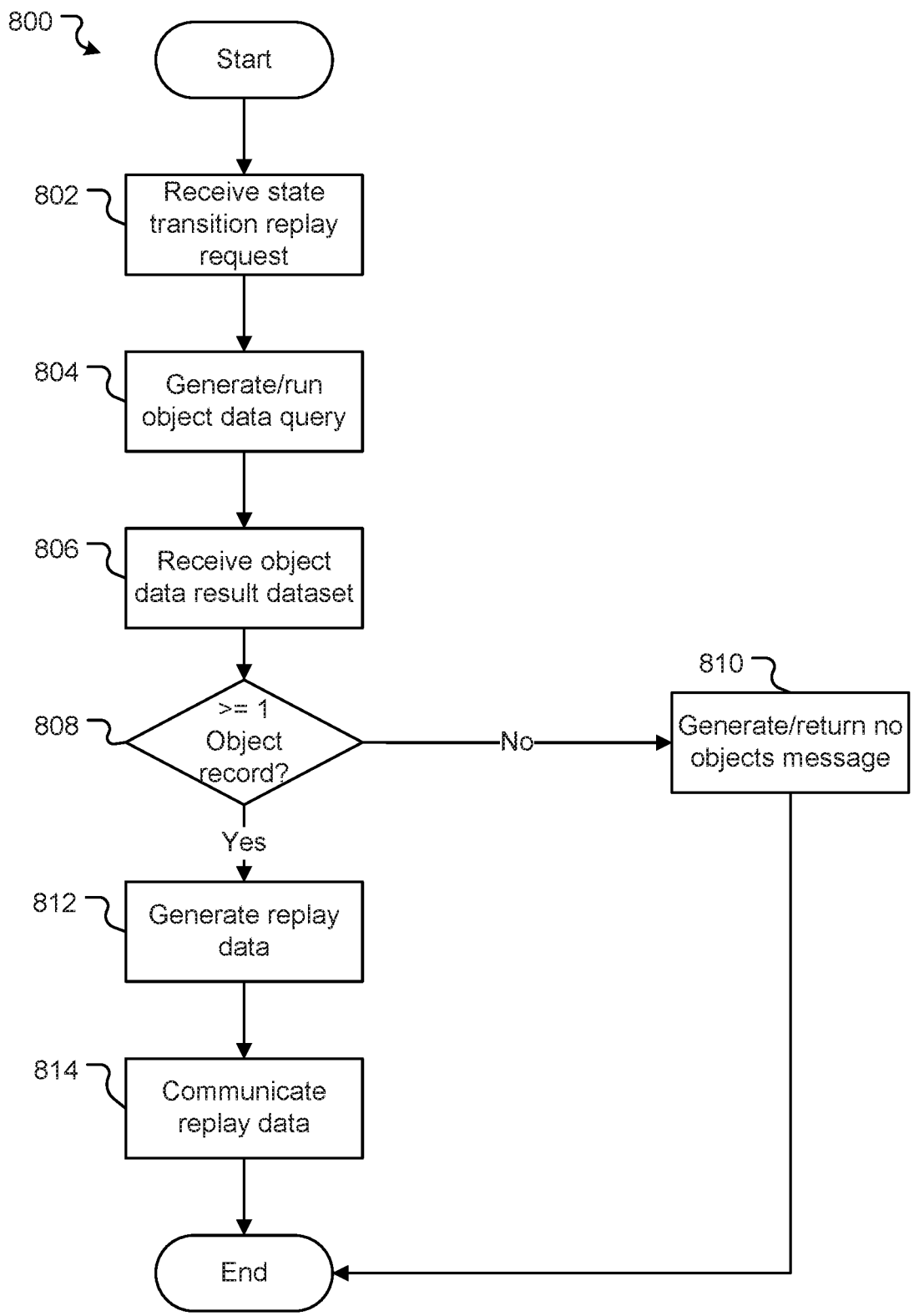
FIG. 8 is a flowchart depicting operations performed in processing a state transition replay request.

Requesting and responding to state transition replays will be described with reference to state transition replay request process 800 of FIG. 8. The operations of process 800 are described as being performed by the OTM 512, but in alternative implementations could be performed by the alternative applications (running on object tracking system 504 or an alternative system in communication therewith).

Generally speaking, a state transition replay request includes criteria that allow the OTM 512 to determine the time period over the replay is to cover and the objects that are to be shown in the replay.

At 802, the OTM 512 receives a state transition replay request from a client application (e.g. 508). The request includes replay request criteria.

The replay request criteria includes time period data from which a start time and end time can be determined. Various ways of defining a start and end time are possible. For example, the time period data may include explicit start time and end time data. Alternatively, the time period data may include a start time and a number of time intervals (e.g. seconds, minutes, hours, or other time interval), the end time being calculable by adding the number of time intervals to the start time. Further alternatively, the time period data may include an end time and a number of time intervals, the start time calculated by subtracting the number of time intervals from the start time.

The time period data may define a single instant in time—e.g. a time period in which the start and end times are the same. In this case the state transition replay request is effectively a request for a point-in-time snapshot of object states.

The time period data will typically define a start time that is earlier than the end time. Certain implementations may require this and prevent a user from specifying a start time that is later than the end time.

The replay request criteria can also include object selection criteria which can be used to filter objects that will be included in the state transition replay.

A request can omit object selection criteria or include object selection criteria that do not define any limitations. In this case the request is to view a state transition replay that includes all state transitions of all objects maintained by/accessible to the OTM 512 within the specified time period.

Where one or more object selection criteria are provided it/they may take any suitable form and be defined with respect to an available object variable or logical combinations of object variables (e.g. using AND, OR, NOT, type operators). Object selection criteria may also include criteria relating to state transitions themselves.

To provide a few examples, object selection criteria may specify: only objects of a particular type (e.g. only epic type objects or only story type objects); only objects that belong to a particular epic (e.g. epic A); only objects assigned to a particular assignee (e.g. only objects assigned to team A or individual B); only objects that have transitioned to or through a particular state within the time period defined by the time period data; only objects that have transitioned to or through a particular state more than a set number of times within the time period defined by the time period data (e.g. to try and catch objects that have been through a 'code review' state more than n times); only objects that have not transitioned at all through the defined time period (recognising that this will, effectively, result in a static state transition replay showing any objects that have not made any state transitions in the time period).

The state transition replay request may be generated by the client application 508 in various ways. For example, the client application 508 may (on operation of a request replay user interface control) cause a state transition replay request interface to be displayed, the interface including various user interface elements permitting user input to define the replay request criteria. For example, the user interface may include a calendar selection tool for selecting a start and end time. The user interface may further include an object selection interface allowing the user to specify various object selection criteria, for example via drop down boxes, text entry fields, and/or other appropriate user interface tools. The replay request interface may provide default options for various criteria—for example setting an end time as the current date, setting the object selection criteria as all objects etc. In addition, or alternatively, the replay request interface may provide the ability for users to create and save specific transition replay requests that can then be initiated as desired (for example, a request to replay transitions in respect of all objects matching x object selection criteria over the last n days).

On receiving the object selection criteria the OTM 512 determines the relevant objects: i.e. objects that satisfy the object selection criteria and to which the request relates. As noted, if no object selection criteria are defined, or criteria indicating no constraints/all objects, the OTM 512 determines that the request relates to all objects the OTM 512 has access to.

Relevant objects are identified by their object identifiers. In some implementations, the OTM 512 may maintain a copy all data necessary to process the selection criteria in the state transition data 518.

In the present example, however, this is not the case. Accordingly, at 804 the OTM 512 generates an object data query based on the object selection criteria and causes it to be run on the object tracking system data 516. Depending on implementation, the OTM 512 may be able to run the object data query directly on the object tracking system data 516, or may need to pass it to the server application 510 to run. Further alternatively, the OTM 512 can be configured to pass the object selection criteria to the server application 510 for the server application to generate/run a corresponding object data query based thereon.

In the present embodiment, the object data query is generated to not only return the object identifiers of objects that match the object selection criteria, but to also return other object data that is to be used or made available during the state transition replay (discussed below). This prevents having to run a second query on the object tracking system data 516.

At 806, the OTM 512 receives an object data result dataset (either directly from the data storage 514 or via the server application 510). The query result dataset includes a record in respect of any/all objects that match the object selection criteria. The result dataset record for a given object includes the object identifier and any other associated data requested in the object data query.

At 808, the OTM 512 determines whether the result dataset includes at least one record. If not, processing continues to 810 where the OTM 512 generates a return message indicating that that no objects match the object selection criteria and returns this to the client application 508. The client application can then display this in an appropriate user interface (and optionally allow a user to amend their object selection criteria to submit a new state transition replay request). Process 800 then ends.

If the result dataset does include at least one record, processing continues to 812. At 812, the OTM 512 uses the result dataset (received at 806) and the time period defined in the state transition replay request (received at 802) to generate replay data. The manner in which replay data is generated, and the form/content of the replay data may vary. In the present implementation, however, and referring to the example state transition data structure described in Table A above, the OTM 512 uses each object identifier (returned in the object data result dataset at 806) to query the state transition data 518 and generate a starting state dataset and a transitions dataset.

The starting state dataset defines the starting states of relevant objects (i.e. objects identified in the result dataset received at 806) in the transition replay. To generate the starting state dataset, for each relevant object the OTM 512 searches the state transition data 518 for the state transition record with the relevant object ID to and a transition time stamp that is before the start of the defined time period and closest to the start of the time period. The starting state for the relevant object in the transition replay is then the 'transition to' state value of that record. If there is no record for the relevant object that has a transition timestamp before the start of the time period, the object did not exist (or, at least, was not assigned a state) at the start of the time period. In this case the object is not visible at the start of the transition replay.

The transitions dataset defines object state transitions that will be animated in the replay. To generate the transitions dataset, for each relevant object the OTM 512 searches the state transition data 518 for all state transitions records that relate to the relevant object and have a transition timestamp at or after the start of the time period and before or at the end of the time period. In the present embodiment, the records of the transitions dataset are ordered chronologically by transition timestamp (earliest time to latest time)—i.e. the order in which they are to be animated in the transition replay.

To illustrate the starting state and transitions datasets, consider again the example state transition data structure shown above and a state transition query that captures objects with object identifiers 1 and 3 only, and a time period from 2 pm on 12 Sep. 2019 to 5 pm on 14 Sep. 2019. In this case, an example starting state dataset is as follows:

| Object Identifier | Starting state identifier |
| --- | --- |
| 1 | A |
| 3 | ~ |

In this example starting state dataset a record for object Id 3 has been provided indicating that it has no starting state (and should not be shown at the start of the transition replay). Alternatively, the starting state dataset could simply omit any record for object identifier 3.

An example transitions dataset for the same query is as follows:

| Object Identifier | Transition from state | Transition to state | Transition timestamp |
| --- | --- | --- | --- |
| 3 | ~ | A | 12/09/2019 2:20 PM |
| 3 | A | B | 12/09/2019 3:00 PM |
| 3 | B | C | 13/09/2019 8:00 AM |
| 3 | C | B | 14/09/2019 4:45 PM |
| 3 | B | A | 14/09/2019 4:50 PM |

At 814, the OTM 512 communicates the replay data (in this case the starting state and transitions dataset) to the client application 508. Communication of the replay data may be in a single transmission (e.g. a replay data message or the like) or in a stream of data. Once the replay data has been sent process 800 ends.

In certain implementations there may be a need for the OTM 512 to manage permissions—i.e. to ensure that a user requesting information on objects/object transitions has permission to view the objects/transitions ultimately provided. Permissions can be managed in various ways. As one example, the OTM 512 can include a user identifier (either received in/with the state transition replay request at 802 or known from a user login process or the like) in the object data query of 804. When the object data query is run only information in respect of objects that the submitted user identifier has permission to access are returned. Accordingly, when the OTM 512 queries the state transition data 518 to generate the replay data it only has object identifiers for objects the user has permission to access/view.

This section describes the generation and presentation of state transition replays based on replay data received from the object tracking system 504—for example replay data as communicated at 816 of process 800 above.

Generation and presentation of state transition replays will be described as being performed by the client application 508. While direct control of the client system hardware will be performed by the client application 508 (typically in conjunction with other applications, e.g. a client system application operating system) some operations described in this section could potentially be performed by either the server application 510 or the client application 508 (with suitable communications between).

Figure 9:
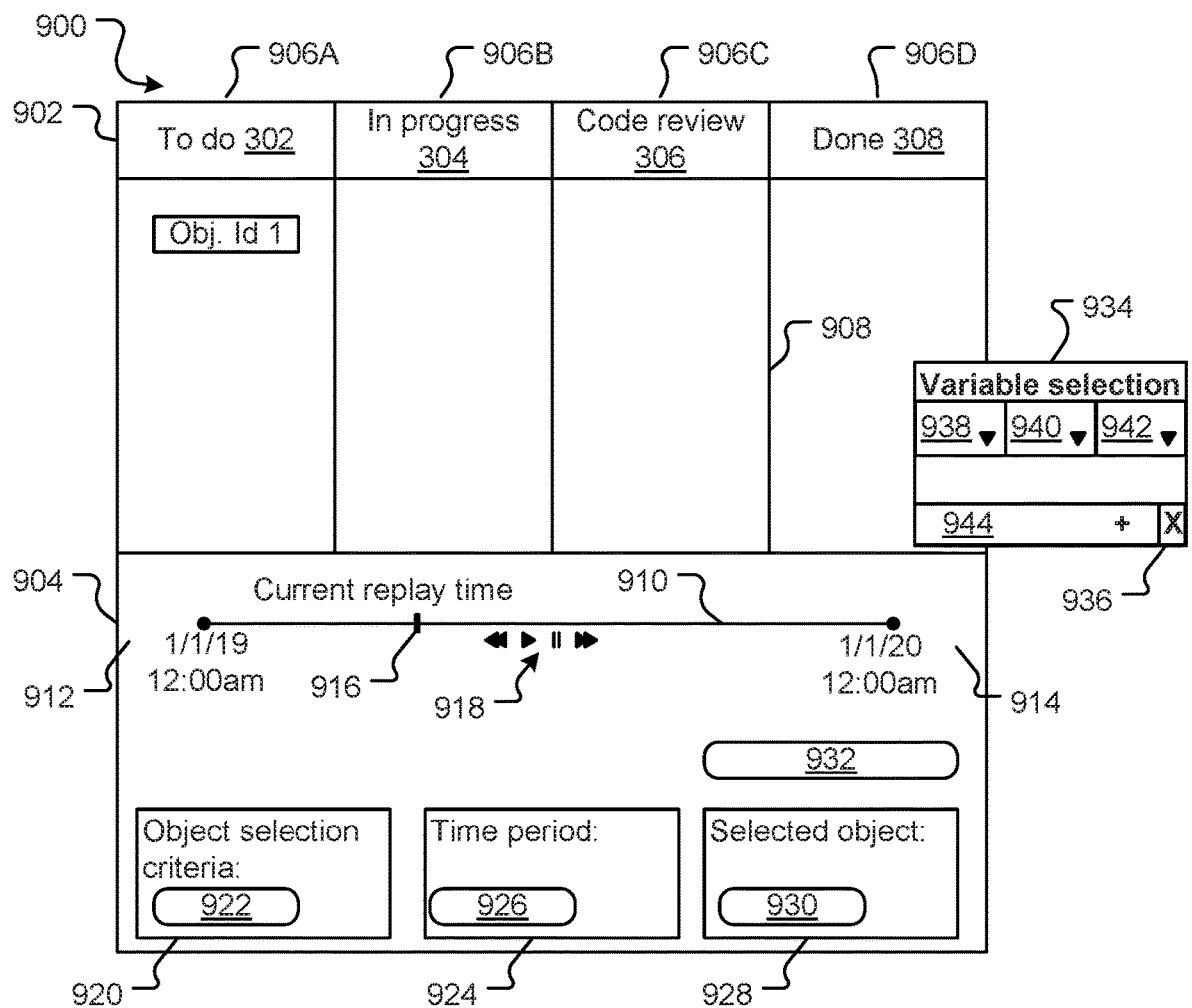
FIG. 9 depicts a state transition replay interface.

On receiving replay data from the object tracking system 504 the client application 508 generates a state transition replay interface in which the state transition replay will be presented. FIG. 9 provides an example state transition replay interface 900 which is presented on a display of a client system 502. Interface 900 may occupy the entire display or part thereof.

Interface 900 of the present example 900 includes a transition replay area 902 and a control area 904.

The transition replay area 902 is the area in which object transitions captured by the replay request are shown. In this example it has the same form as board 300 described above. The replay area 902 is divided into a plurality of state areas 906. In this example four state areas are shown 906A-D corresponding respectively to 'to do', 'in progress', 'code review', and 'done' states.

More generally, a given state area 906 corresponds to a particular state and is presented in such a way to be visually distinguishable from other state areas 906. In example 900, the state areas 906 are columns and visually distinguished by use of vertical separation lines 908. State areas could, however, be presented and visually distinguished by different mechanisms. For example, state areas could be shown as rows of a table, as separate shapes (e.g. boxes/circles/triangles/arbitrary shapes), as specifically coloured/shaded areas, or as any other visually distinguished areas of a display.

Control area 904 of interface 900 includes user interface elements that provide information in respect of the replay controls for controlling the replay. In this example control area 904 includes a playback bar 910. The leftmost and rightmost ends of the playback bar 910 indicate start and end times respectively—i.e. the start and end of the time period specified in the replay request. Start and end time labels 912 and 914 are also shown, in this case showing the time in day/month/year/hour/minute format, however alterative time formats could be used. Playback bar 910 also includes a current position indicator 916 indicating the current position within the playback. The current position indicator has an associated current time label which shows the actual time at the current position. In certain implementations the current position indicator 916 is a current position control which can be manipulated by a user to change the position within the replay—for example by touching and dragging (in the case the display is a touch screen display) or by clicking and dragging along the playback bar 910. In certain implementations the interface is configured so a user can interact with the playback bar 910 at any location (e.g. by clicking or touching the bar 910 at a particular location) in order to cause the replay to go to the time represented by that location.

Control area 904 also includes additional playback controls 918, in this case a play control (on detecting activation of which the client application 508 commences or continues the transition replay), a pause control (on detecting activation of which the client application 508 causes the replay to pause/un-pause), a fast-forward control (on detecting activation of which the client application 508 causes the replay to increase in speed), and a rewind control (on detecting activation of which the client application 508 causes the replay to decrease in speed).

Control area 904 also includes an object selection criteria area 920. In this area, the client application 508 displays the object section criteria selected in the state transition replay request that was submitted to generate the current state transition replay. Object selection criteria area 920 includes a change criteria control 922 which can be activated by a user to change the current object selection criteria. If new object selection criteria are chosen by a user these form the basis of a new (or modified) state transition replay (e.g. via a new request process 800).

Control area 904 also includes a time period area 924. In this area, the client application 508 displays the time period selected in the state transition replay request that was submitted to generate the current state transition replay. Time period area 920 includes a change time period control 926 which can be activated by a user to change the current time period. If new object selection criteria are chosen by a user these form the basis of a new (or modified) state transition replay. It may be the case that only part of request process 800 need be performed If only the time period is changed only.

Control area 904 also includes a selected object information area 928. In some implementations a user can select an object in the transition replay area 902, for example by contacting, clicking on, hovering over or otherwise selecting an object. When an object is selected information in respect of the object can be displayed in the selected object information area 928 (e.g. object information returned at 806 or otherwise obtained/accessed). The object information area 928 also includes an access object control 930. When activated by a user the access object control 930 redirects the user to an object view in respect of the selected object—i.e. a 'normal' object view of the object (in its current rather than historical state) as provided by the object tracking system 504.

Transition replay area 902 of FIG. 9 includes a representation of a single object (the object with identifier 1). This is the start state defined by the example starting state dataset of Table C above.

Figure 10A:
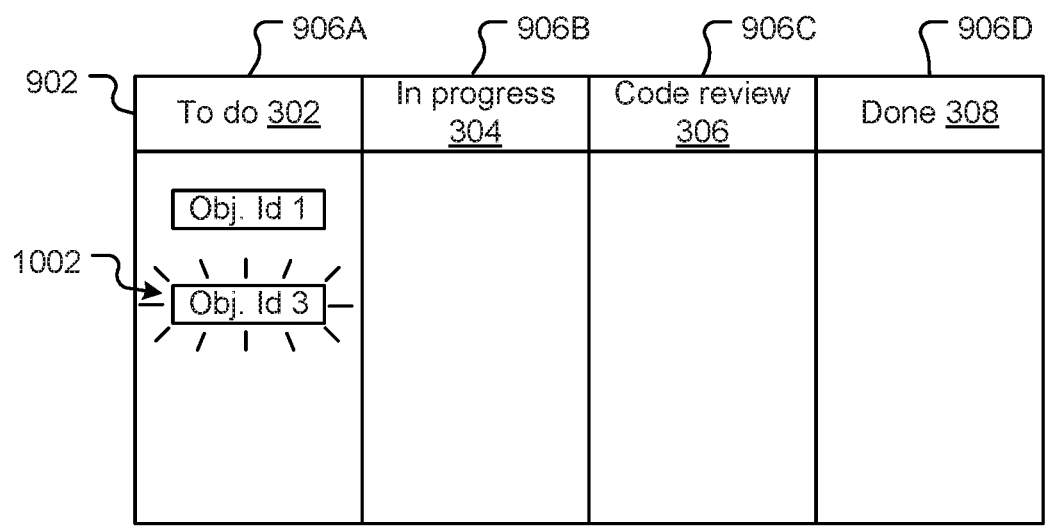
Figure 10B:
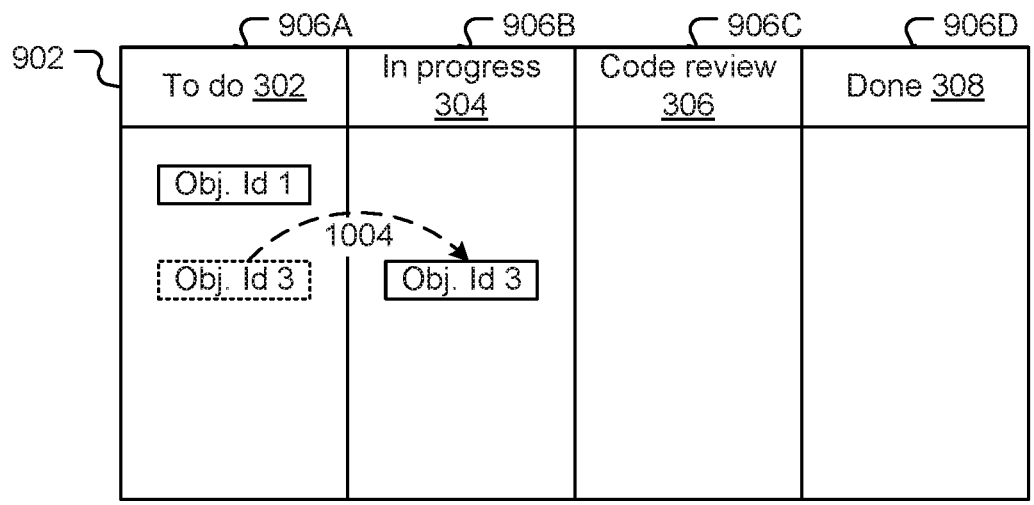
Figure 10E:
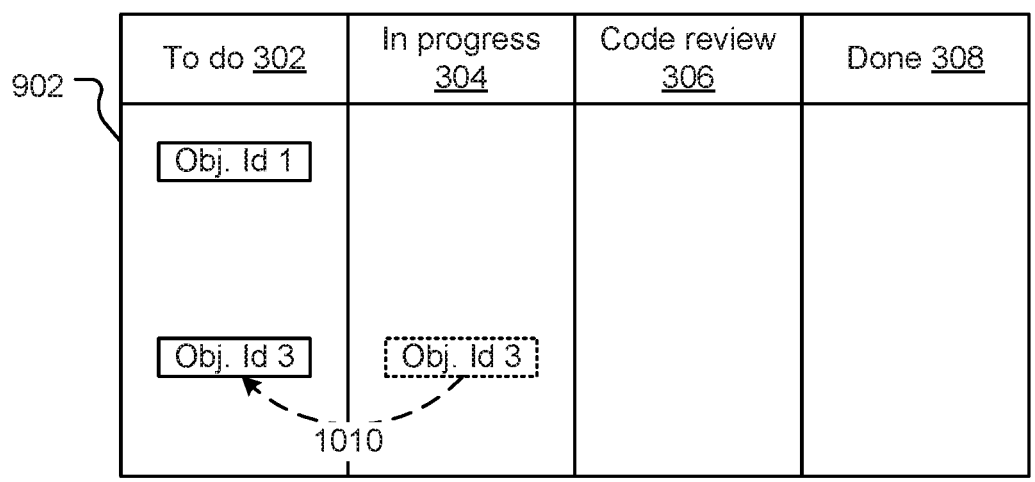

The transition replay may commence on the interface being displayed or may require a user to start the replay—for example by activation of the play control. In either event, once the replay begins (and unless stopped or paused by the user) animated transitions in accordance with the replay data (and, specifically in this example, the transitions dataset) are displayed. FIGS. 10A to 10E depict the transition replay area 902 with a sequence of animations according to the example transitions dataset of Table B above. Specifically: FIG. 10A depicts an animation 1002 of the appearance of the representation of object 3; FIG. 10B depicts an animation 1004 of the representation of object 3 moving from state area 906A (to do) to state area 906B (in progress); FIG. 10C depicts an animation 1006 of the representation of object 3 moving from state area 906B (in progress) to state area 906C (code review); FIG. 10D depicts an animation 1008 of the representation of object 3 moving from state area 906C (code review) to state area 906B (in progress); and FIG. 10E depicts an animation 1010 of the representation of object 3 moving from state area 906B (in progress) to state area 906A (to do).

Per the example transitions dataset described above, object 1 does not transition and therefore remains stationary throughout the sequence of FIGS. 10A to 10E.

In the example replay area 902, the graphical representations of objects are rectangles and the text displayed is the object identifier. To improve user understanding, the text shown on a given object representation would typically be (or at least include) an object name or the like instead of (or in addition to) a system identifier of the object. The client application 508 can be configured to display any object variable data available (or combination of object variable data) on an object's representation.

In addition, the client application 508 may be configured to depict state transition animations in any suitable manner. For example, in this example object creation animation 1002 has been depicted as an object appearing with a sunburst type effect. Alternatively, an object creation animation could be growing an object representation from a smaller (or no) size to a normal size, or by an alternative object appearance animation. If permitted by the object tracking system, object deletion (or assignment of an object to no state) can be shown by shrinking the object representation to a zero size, or an alternative object disappearance animation. A movement animation—i.e. animating movement of an object from one state to another (e.g. animations 1004, 1006, 1008, and 1010) will typically involve displaying movement of the representation of the object from a position in the area associated with the start (or from) state to a position in the area areal with the end (or to) state defined by the transition.

During replay, object state transitions are replayed in the order in which they historically occurred. In one replay mode, referred to as the constant delay replay mode, successive state transition animations are replayed with a constant, predefined time delay in between (e.g. 0 seconds, ½ a second, 1 second, 2 seconds, or any other time period). That is, the time at which object transitions occurred is used to determine the order of transitions but the time between object transitions is ignored. In an alternative replay mode, referred to as the time based delay replay mode, successive state transition animations are replayed with a delay in between that is calculated based on the actual state transition times of the objects (and delays between) and, optionally, the overall time period the replay is representing.

To illustrate these two replay modes, consider a first state transition of an object that was made at time A, a second state transition of an object made at time B, B being 30 minutes after time A, and a third state transition of an object made at time C, C being two hours after time B.

In the constant delay replay mode: the first transition is animated; the second transition is animated at time Y (Y=the end of first transition animation+the constant delay period); the third transition is animated at time Z (Z=the end of second transition animation+the constant delay period).

In the time based delay replay mode, the delay between the animation of the first transition ending and the animation of the second transition beginning is shorter than the delay between the animation of the second transition ending and the animation of the third transition beginning—reflecting the fact that the actual delay between the first and second transitions was 30 minutes while the actual delay between the second and third transitions was longer (two hours). The actual delay between transition animations can be calculated as desired. As one example, the client application 508 can be configured so that for a transition replay covering a real time period of between two and five hours, a replay delay of one second for every 15 minutes of actual time is to be calculated. In this case, the delay between the first and second transition animations would be 2 seconds (2*15=30), and the delay between the second and third transition animations 8 seconds (8*15=120). Alternative real time to animation delay calculations can be used, and different calculations used depending on the overall real time period.

If two or more state transitions (with respect to two or more different objects) are recorded in the state transition data as occurring at the same time, their state transitions are animated simultaneously in the replay.

Where both replay modes are supported, a user interface control (not shown) may be provided to enable a user to switch between them. In some cases only one of the constant delay or time based delay replay modes may be made available. Other replay modes in which the delays between transition animations are calculated in alternative ways can additionally or alternatively be implemented.

Returning to FIG. 9, control area 904 further includes a distinguish objects control 932. Generally speaking, the distinguish objects control 932 allows a user to define one or more sets of objects that are to be visually distinguished from one another in the transition replay.

If the client application 508 detects activation of the distinguish objects control 932 it causes a variable selection interface such as 934 to be displayed. Generally speaking, the variable selection interface allows a user to select a particular object variable (or combination of variables) for which data is available—e.g. by being maintained by the OTM 512 (in state transition data 518), or obtained from the object tracking system data 516 (either at 806 or an alternative time).

If the user selects a variable he or she can also select a value (or range of values) for that variable, thereby defining a set of objects (i.e. any objects with variables meeting the selected value/range—which may be none, thus creating an empty set).

The user can also select an appearance, defining the appearance that objects in the defined set will be displayed with in order to visually distinguish them from objects that are not in the defined set.

In this particular case, the variable selection interface 934 is a pop-up interface which the client application 508 displays on detecting activation of the identify objects control 932. If the client application 508 detects activation of a close variable selection interface control 936 it hides or closes the variable selection interface 934.

Variable selection interface 934 includes a select variable control 938. On detecting activation of the select variable control 938, the client application 508 displays (or allows a user to search for) variables for which data is available and allows a user to select a variable. If the user selects a variable the client application 508 displays (or enables if already displayed) an associated select value control 940 (allowing the user to select a value or range of values for the selected variable) and an associated select appearance control 942 (allowing the user to select an object appearance that will be taken by objects with the selected variable matching the selected value/range.

The client application 508 may be configured to provide a selection of default object appearances for distinguishing objects within the replay area. Alternatively, or additionally, the client application 508 may allow a user to create their own object appearances. In either case, an object appearance is one or a combination of object visual features, such as: object background colour, object font colour, object font type, object font size, object glow, object, shadow, or other object visual feature.

Object appearances may additionally (or alternatively) be defined by other visual features displayed in the replay area 902. For example, objects may be visually distinguished by use of one or more visually distinct regions (different to the distinct state areas 906). For example, where state areas are shown in vertical columns (such as in replay area 902), visually distinct regions may be horizontal lanes demarcated. In this case, different lanes can be assigned to objects with different variable values/ranges.

Figure 11:
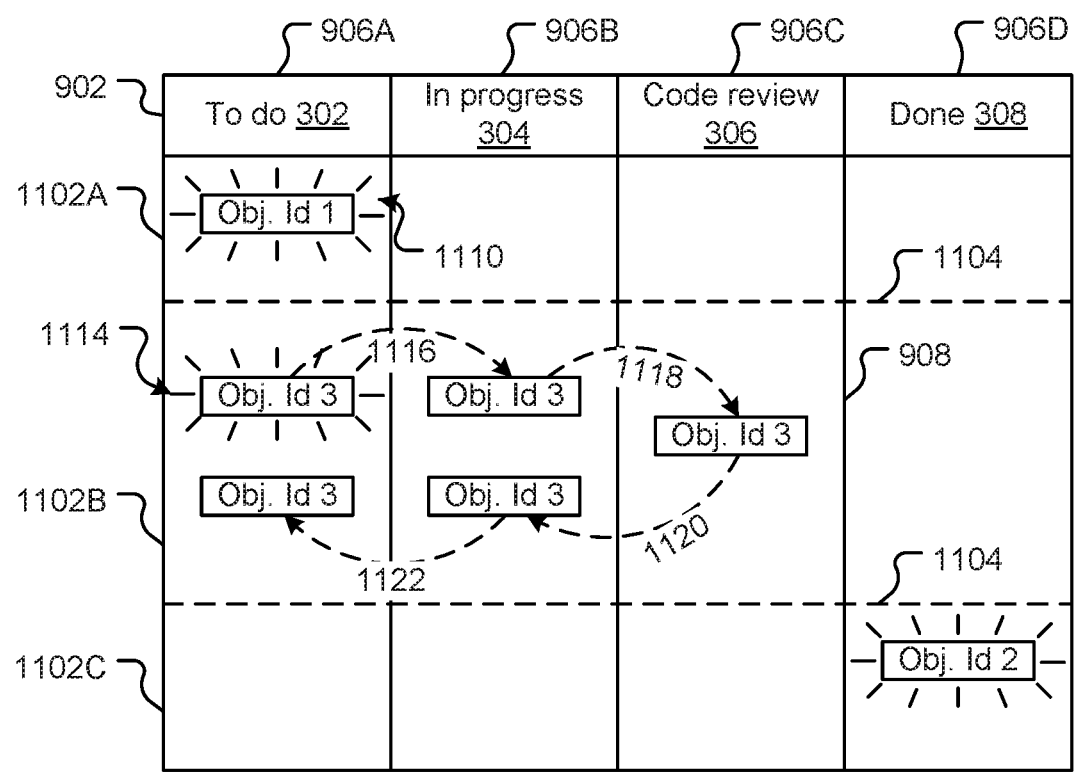
FIG. 11 depicts another state transition replay.

FIG. 11 provides a depiction of a replay area 902 with three lanes 1102A, 1102B, and 1102C demarcated by horizontal lanes 1104. In the example of FIG. 11, the object of task one is shown in lane 1102A, the object of task 3 in lane 1102C, and the object of task 2 in lane 1102B. This could arise, for example, if: the object of task 1 is assigned to assignee A, the object of task 2 is assigned to assignee B, the object of task 3 is assigned to assignee C, and the user requests for objects assigned to different assignees to be visually distinguished from one another.

The replay area in FIG. 11 depicts a replay sequence illustrating all transitions in Table B above, namely: an appearance animation 1110 for the appearance of object id 1; an appearance animation 1112 for the appearance of object id 2; an appearance animation 1114 for the appearance of object id 3; and state transitions 1116, 1118, 1120, and 1122 for the state transitions of object id 3.

Variable selection interface 934 further includes an add variable control 944. If the client application 508 detects activation of a the add variable control 944 it displays an additional variable selection control (not shown) by which a user can select a further variable, value/range, object appearance combination. This allows a user to select multiple different variables to distinguish (e.g. per the FIG. 10 example where three different variable values (assignees A, B, and C) were distinguished by use of paths). The client application 508 may be configured to provide a more sophisticated variable selection interface to allow users to define combinations of variable values to be distinguished. Generally speaking, however, the variable selection interface 934 allows a user to visually distinguish or highlight objects based on desired criteria. For example, a user may have a particular interest in objects (e.g. tasks) that have been assigned to a particular person or team (assignee x). By selecting the variable as the assignee variable (e.g. using control 938), the value as assignee x (e.g. using control 940), then a particular appearance (e.g. red background), all objects assigned to assignee x are shown with a red background and thereby visually distinguished over objects that are not assigned to assignee x which are shown with the default background (e.g. white).

While depicted as separate areas, the replay area 902 and control area 904 may overlap (e.g. with controls having a transparency or otherwise don't significantly impact the viewability of object transition information being shown in the replay area 902). Further, although the various elements of the control area 904 are depicted as being grouped in a single control area 904 they could be positioned in separate areas/positions.

The example state transition replay interface 900 is provided for the purpose of illustrating various interface and replay features. Many alterative interfaces are, however, possible. A given interface may: include one or more different user interface elements that provide similar or the same functionality as user interface elements described above; include one or more additional user interface elements that provide different functions to those described above; and/or omit one or more user interface elements described above and not provide the associated functionality thereof.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer implemented method comprising:
receiving, from a client device operating a client instance of an object tracking system, a state transition replay request, the state transition replay request including a time period and object selection criteria for selecting one or more objects tracked by the object tracking system, each object having an object state of a plurality of object states defined by an object workflow;
generating an object data query based on the object selection criteria for selection of the one or more objects;
identifying a set of object identifiers corresponding to a plurality of objects in accordance with the object data query;
retrieving object data associated with each object identifier of the set of object identifiers;
for a particular object of the plurality of objects and based on the retrieved object data corresponding to the time period, identifying a first object state, a second object state, and a third object state based on a particular object workflow for the particular object as the particular object was tracked by the object tracking system;
generating a first state transition between the first object state and the second object state;
generating a second state transition between the second object state and the third object state;
generating a state transition replay response using the first state transition and the second state transition; and
responsive to the state transition replay request, transmitting the state transition replay response to the client device, wherein the state transition replay response causes display of an animation in which a graphical object corresponding to the particular object is animated from a first location in a graphical user interface (GUI) corresponding to the first object state to a second location in the GUI corresponding to the second object state, and from the second location in the GUI to a third location in the GUI corresponding to the third object state.

2. The computer implemented method of claim 1, wherein the first location, the second location, and the third location in the GUI are visually distinct from each other.

3. The computer implemented method of claim 1, wherein each state transition of the first state transition and the second state transition is animated with a predefined constant time delay between successive state transition animations.

4. The computer implemented method of claim 1, wherein each state transition of the first state transition and the second state transition is animated with a time delay between successive state transition animations that is based on original state transition times.

5. The computer implemented method of claim 4, wherein the time delay between successive state transition animations is further based on a duration of the time period.

6. The computer implemented method of any claim 1, further comprising:
receiving a request to visually distinguish one or more sets of defined objects in the displayed animation; and
responsive to the request to visually distinguish the one or more sets of defined objects, modifying an appearance of at least one object in the displayed animation to visually distinguish it over at least one other object displayed in the animation.

7. The computer implemented method of claim 6, wherein the request to visually distinguish one or more sets of defined objects includes, for each set, one or more object variables and associated values which define membership of the set.

8. The computer implemented method of claim 6, wherein visually distinguishing a first set of objects over a second set of objects comprises displaying any objects in the first set of objects in a first lane and displaying any objects in the second set of objects in a second lane.

9. The computer implemented method of claim 1, wherein at least one state transition animation is a movement animation showing movement of an object from a starting state to a finishing state.

10. The computer implemented method of claim 1, wherein at least one state transition animation is selected from a group comprising: an appearance animation in which an object that was not previously visible is displayed in a particular state; and a disappearance animation in which an object that was previously visible is removed from display.

11. A computer processing system comprising:
a processing unit;
a communication interface;
a display; and
a non-transient computer-readable storage medium storing sequences of instructions, which when executed by the processing unit, cause the processing unit to:
receive a state transition replay request including a time period and object selection criteria for selecting one or more objects tracked by an object tracking system, each object having an object state of a plurality of object states defined by an object workflow;
generate an object data query based on the object selection criteria for selection of the one or more objects;
in accordance with the object data query, retrieve object data associated with each object identifier of a set of object identifiers, each object identifier of the set of object identifiers corresponds to an object of a plurality of objects;
for a particular object of the plurality of objects and based on the retrieved object data corresponding to the time period, identify a first object state, a second object state, and a third object state based on a particular object workflow for the particular object as the particular object was tracked by the object tracking system;
generate a first state transition between the first object state and the second object state;
generate a second state transition between the second object state and the third object state;
generate a state transition replay response using the first state transition and the second state transition; and
responsive to the state transition replay request, transmit the state transition replay response to a client device, wherein the state transition replay response causes display of an animation in which a graphical object corresponding to the particular object is animated from a first location in a graphical user interface (GUI) corresponding to the first object state to a second location in the GUI corresponding to the second object state, and from the second location in the GUI to a third location in the GUI corresponding to the third object state.

12. The computer processing system of claim 11, wherein the first location, the second location, and the third location in the GUI are visually distinct from each other.

13. The computer processing system of claim 11, wherein each state transition of the first state transition and the second state transition is animated with a predefined constant time delay between successive state transition animations.

14. The computer processing system of claim 11, wherein each state transition of the first state transition and the second state transition is animated with a time delay between successive state transition animations that is based on original state transition times.

15. The computer processing system of claim 14, wherein the time delay between successive state transition animations is further based on a duration of the time period.

16. The computer processing system of claim 11, wherein execution of the sequences of instructions further causes the processing unit:
receive a request to visually distinguish one or more sets of defined objects in the displayed animation; and
responsive to the request to visually distinguish the one or more sets of defined objects, modify an appearance of at least one object in the displayed animation to visually distinguish it over at least one other object displayed in the animation.

17. The computer processing system of claim 16, wherein the request to visually distinguish one or more sets of defined objects includes, for each set, one or more object variables and associated values which define membership of the set.

18. The computer processing system of claim 16, wherein visually distinguishing a first set of objects over a second set of objects comprises displaying any objects in the first set of objects in a first lane and displaying any objects in the second set of objects in a second lane.

19. The computer processing system of claim 11, wherein at least one state transition animation is a movement animation showing movement of an object from a starting state to a finishing state.

20. The computer processing system of claim 11, wherein at least one state transition animation is selected from a group comprising: an appearance animation in which an object that was not previously visible is displayed in a particular state; and a disappearance animation in which an object that was previously visible is removed from display.

\* \* \* \* \*